Sept. 29, 1953  C. J. SPENCER  2,653,574
CATTLE LEADER
Filed Sept. 12, 1952
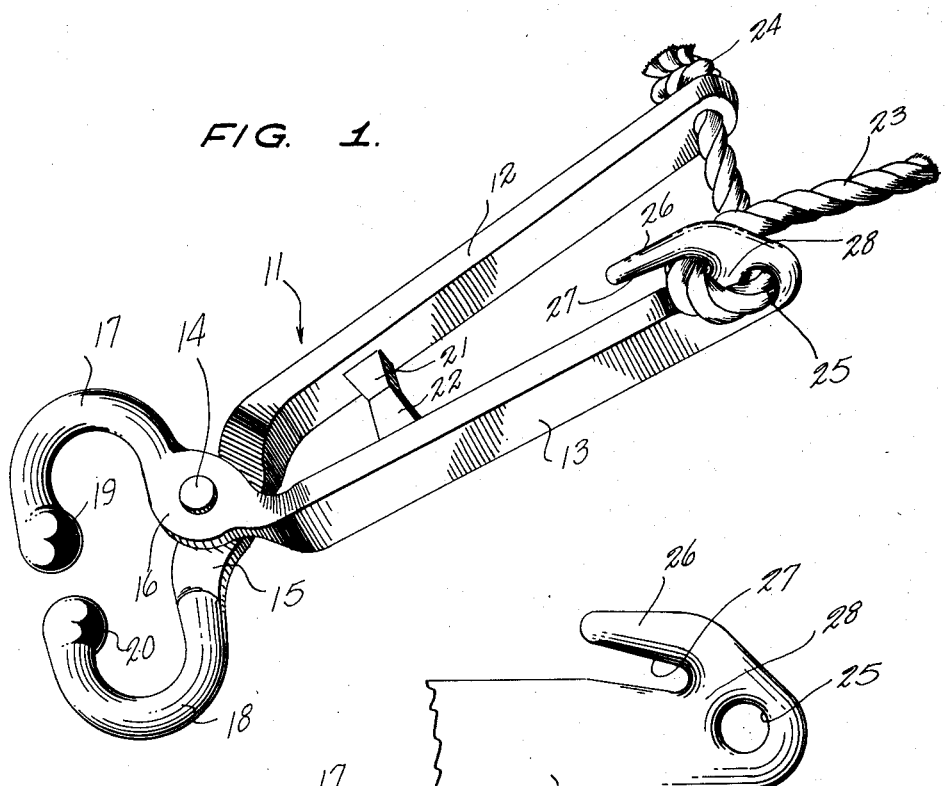
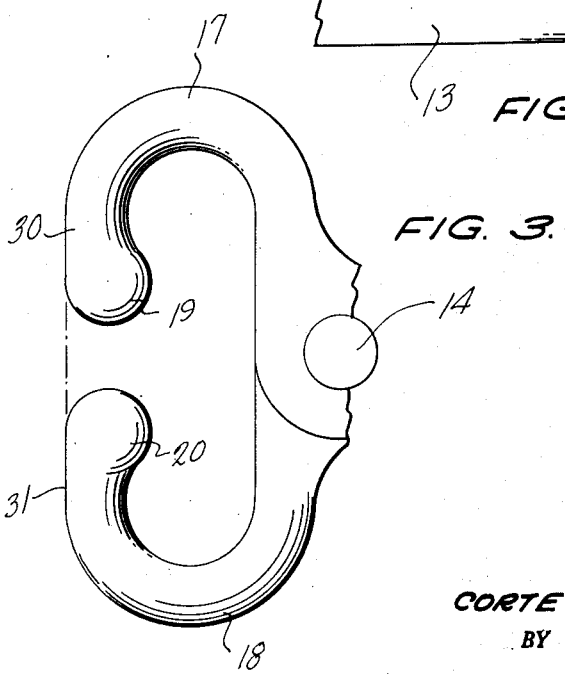
INVENTOR.
CORTE J. SPENCER,
BY
McMorrow, Berman & Davidson
ATTORNEYS.

Patented Sept. 29, 1953

2,653,574

UNITED STATES PATENT OFFICE 2,653,574

CATTLE LEADER

Corte J. Spencer, Dundee, N. Y.

Application September 12, 1952, Serial No. 309,210

3 Claims. (Cl. 119—154)

1

This invention relates to cattle controlling devices, and more particularly to an improved cattle leading implement adapted to engage the nose of an animal to be handled or led.

The main object of the invention is to provide a novel and improved cattle leading implement which is simple in construction, which is easy to operate, and which provides a secure grip on the nose of the animal being led.

A further object of the invention is to provide an improved animal leading implement which is inexpensive to manufacture, which is rugged in construction, and which is arranged to provide a secure grip on the nose of the animal being led, the device being arranged so that the grip is not relaxed when the tension on the leading rope is reduced.

Further objects and advantages of the invention will become apparent from the following description and claims, and from the accompanying drawings, wherein:

Figure 1 is a perspective view of an improved animal leading implement constructed in accordance with the present invention.

Figure 2 is a fragmentary enlarged elevational view of the end portion of one of the handle bars of the leading implement of Figure 1.

Figure 3 is a fragmentary top plan view of the forward portion of the implement showing the transverse alignment of the forward surfaces of the hook members of the implement.

Referring to the drawings, the implement is designated generally at 11 and comprises a pair of elongated handle bars 12 and 13 which are pivotally connected by a transverse rivet 14 extending through the flattened end portions 15 and 16 of the handle bars 12 and 13. Integral with the flattened end portion 16 of the handle bar 13 is a first hook member 17 and integral with the flattened end portion 15 of the handle bar 12 is a second hook member 18 which opposes the first hook member 17. Formed on the end of the hook member 17 is a first ball 19 and formed on the end of the hook member 18 is a second ball 20 which opposes the ball 19, as shown in Figure 1. As shown in Figure 3, the balls 19 and 20 are offset inwardly relative to the transverse axis of the outer portions of the hook members 17 and 18, and the forward surfaces of said hook members are substantially straight and are in transverse alignment.

Integrally formed on and projecting from the inside surfaces of the handle bars 12 and 13 at their intermediate portions are the respective stop lugs 21 and 22 which are arranged to come together in abutting relationship to limit movement of the nose-engaging balls 19 and 20 toward each other.

Designated at 23 is the lead rope which extends through an aperture formed in the end of the handle bar 12, said rope being formed with a knot 24 at its end so that it may be anchored in the aperture. The end of the handle bar 13 is formed with an aperture 25 through which the rope 23 extends, and said handle bar is further formed with an elongated lug 26 adjacent the aperture 25, said lug 26 extending forwardly over the handle bar 13 for a substantial distance and defining a slot 27 therewith. The slot 27 is slightly narrower than the diameter of the rope 23, whereby the rope may be frictionally secured in said slot.

As shown in Figure 1, the rope 23 may be engaged through the aperture 25 and then passed around the portion of handle bar 13 intervening between the slot 27 and the aperture 25, said portion being shown at 28. The rope is engaged through the slot 27 and is securely clamped therein by the binding action which occurs when the rope is pulled to a taut condition while arranged as shown in Figure 1. The hook members 17 and 18 have been previously engaged with the animal's nose, the ball elements 19 and 20 engaging on opposite sides of the cartilage of the animal's nose, and the implement thus securely grips the animal's nose when the rope 23 has been pulled to a taut condition. The implement thus retains a secure grip on the animal's nose even after the tension on the rope 23 is reduced, due to the clamping of the rope in the slot 27 in the manner above described.

The implement may be employed to hold the animal's nose while making an incision therein preparatory to installing a ring, since the transversely aligned forward surfaces of the hook elements 17 and 18, shown in Figure 3 at 30 and 31, serve as a guide means for the movement of the knife employed to make the incision, and also provides ample clearance for the manipulation of the knife.

While a specific embodiment of an improved cattle leading implement has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A cattle leader comprising a pair of elongated handle bars, means pivotally connecting said bars, opposed hook members on the forward ends of the bars, a fastening lug on the rear end of one of the bars, said lug extending forwardly substantially parallel to said one of the bars and defining a forwardly opening slot therewith, and a flexible cable secured to the other bar, said cable being slightly greater in thickness than the width of said slot, for frictional securement in said slot, said one of the bars being formed with an aperture located rearwardly of said lug to receive the cable, whereby said cable may be lockingly engaged through said aperture and said slot and around said fastening lug.

2. A cattle leader comprising a pair of elongated handle bars, means pivotally connecting said bars, opposed hook members on the forward ends of the bars, a ball on the end of each hook member, a fastening lug on the rear end of one of the bars, said lug extending forwardly substantially parallel to said one of the bars and defining a forwardly opening slot therewith, and a flexible cable secured to the other bar, said cable being slightly greater in thickness than the width of said slot, for frictional securement in said slot, said one of the bars being formed with an aperture located rearwardly of said lug to receive the cable, whereby said cable may be lockingly engaged through said aperture and slot and around said fastening lug.

3. A cattle leader comprising a pair of elongated handle bars, means pivotally connecting said bars, opposed hook members on the forward ends of the bars, a ball on the end of each hook member, said hook members each having a transverse arm portion adjacent its ball, the transverse arm portion being substantially straight and being in transverse alignment, a fastening lug on the rear end of one of the bars, said lug extending forwardly substantially parallel to said one of the bars and defining a forwardly opening slot therewith, and a flexible cable secured to the other bar, said cable being slightly greater in thickness than the width of said slot, for frictional securement in said slot, said one of the bars being formed with an aperture located rearwardly of said lug to receive the cable, whereby said lug may be lockingly engaged through said aperture and slot and around said fastening lug.

CORTE J. SPENCER.

References Cited in the file of this patent

UNITED STATES PATENTS

| Number | Name | Date |
|---|---|---|
| 265,113 | Loree | Sept. 26, 1882 |
| 1,277,017 | Williams | Aug. 27, 1918 |
| 1,822,822 | Pladson | Sept. 8, 1931 |
| 2,052,371 | Tyler | Aug. 25, 1936 |
| 2,595,432 | Wendt | May 6, 1952 |